(12) United States Patent  
Chapman

(10) Patent No.: US 6,457,931 B1  
(45) Date of Patent: Oct. 1, 2002

(54) TRUCK MOUNTED HOIST

(76) Inventor: Gordon Chapman, 608 Parkridge Close, Camrose (CA), T4V 4P1

( * ) Notice: Subject to any disclaimer, the term of this patent is extended or adjusted under 35 U.S.C. 154(b) by 0 days.

(21) Appl. No.: 09/478,348

(22) Filed: Jan. 6, 2000

Related U.S. Application Data

(60) Provisional application No. 60/115,400, filed on Jan. 8, 1999.

(51) Int. Cl.[7] .................................................. B60P 1/16
(52) U.S. Cl. ........................ 414/491; 414/462; 414/546
(58) Field of Search ................................ 414/462, 482, 414/491, 498, 522, 546

(56) References Cited

U.S. PATENT DOCUMENTS

| | | | |
|---|---|---|---|
| 2,527,369 A | | 10/1950 | Meyer |
| 3,757,972 A | * | 9/1973 | Martin ........................ 414/462 |
| 3,820,606 A | | 6/1974 | Cline et al. |
| 3,825,137 A | * | 7/1974 | Mackrill et al. ............ 414/498 |
| 3,827,589 A | | 8/1974 | Townsend et al. |
| 3,828,379 A | * | 8/1974 | Walston ...................... 414/498 |
| 3,872,989 A | | 3/1975 | Smithson |
| 3,874,537 A | * | 4/1975 | Kou |
| 3,878,948 A | * | 4/1975 | Corompt ..................... 414/546 |
| 3,892,323 A | * | 7/1975 | Corompt |
| 4,053,074 A | * | 10/1977 | Lemaire ...................... 414/491 |
| 4,058,229 A | | 11/1977 | Triplett |
| 5,108,248 A | | 4/1992 | Murrill |
| 5,108,251 A | | 4/1992 | Lougheed |
| 5,232,329 A | | 8/1993 | Livingston |
| 5,328,320 A | * | 7/1994 | Farrow et al. ............... 414/495 |
| 5,380,141 A | * | 1/1995 | Flowers ...................... 414/462 |
| 5,620,296 A | | 4/1997 | McMahon et al. |
| 6,152,674 A | * | 11/2000 | Ogrodnick ................... 414/491 |

FOREIGN PATENT DOCUMENTS

WO     WO 9014250     11/1990

OTHER PUBLICATIONS

Multi Lift brochure entitled "Container applications of unlimited possibilities" undated.
Galbreath Incorporated., brochure entitled "Hook Hoists" 1999.
Gailbreath Incorporated, specifications, 1996.
Galbreath Incorporated, brochure entitled "Serving the World with Quality" 1998.

* cited by examiner

*Primary Examiner*—James W. Keenan
(74) *Attorney, Agent, or Firm*—Bennett Jones LLP

(57) ABSTRACT

A truck mounted apparatus for loading and unloading cargo onto and from the truck includes a support frame, a lever arm pivotally connected to the support frame activated by a hydraulic or pneumatic cylinder, and a cargo carrier. The cargo carrier rests on the support frame when loaded and may be lowered to the ground by the pivoting motion of the lever arm.

3 Claims, 5 Drawing Sheets

TRUCK MOUNTED HOIST

CROSS-REFERENCE TO RELATED APPLICATION

This application claims the priority benefit of U.S. Provisional Application No. 60/115,400 filed on Jan. 8, 1999 and entitled "Truck Mounted Hoist" which application is incorporated herein by reference in its entirety.

FIELD OF THE INVENTION

The present invention relates to a truck mounted apparatus for hoisting cargo onto the cargo area of the truck.

BACKGROUND OF THE INVENTION

Personal motorized recreational vehicles such as motorbikes, snowmobiles and personal watercraft are becoming increasingly popular. There are however few convenient systems to transport such vehicles from place to place. They may be transported in the bed of a pickup truck, however, usually there is only room for one such vehicle and there is no convenient way to lift the vehicle into the truck bed. Snowmobiles have been transported side by side on a deck which is built on top of a pickup truck box, however, getting them onto the deck involves carrying and providing ramps. Accidents involving users driving off the ramp during loading and unloading are not uncommon. As well, a deck wide enough for two vehicles to be side by side will extend significantly wider than the width of the pickup truck.

Therefore, there is a need in the art for a system for loading and unloading cargo from a truck bed which mitigates the limitations of the prior art.

SUMMARY OF THE INVENTION

In general terms, the invention comprises a truck-mounted apparatus for hoisting cargo onto the cargo area of a truck and for lowering the cargo to the ground. In one aspect of the invention, the apparatus comprises:

a) a support frame mounted to the truck and having at least one load-bearing surface;

b) a lever arm having a first end and a second end, wherein the first end is pivotally mounted to the support frame or the truck and said lever arm is pivotally moveable from a first position to a second position;

c) a hydraulic or pneumatic cylinder and piston rod contained within the support frame which is pivotally mounted to the support frame or the truck at one end and pivotally connected to the lever arm at the other end, wherein the rod may extend or retract into the cylinder and further wherein extension of the rod causes the lever arm to move from its first position to its second position;

d) a power supply for driving the cylinder and piston rod and a controller connected to the power supply for controlling the power supply;

f) a cargo carrier comprising a cargo bed and a rigidly connected link arm wherein said link arm is pivotally connected to the second end of the lever arm;

wherein the cargo carrier rests on the support frame when the cylinder rod is retracted and lever arm is in the first position and rests substantially on the ground when the cylinder rod is extended and the lever arm is in the second position.

The lever arm is comprised of a pivot head, a lever rod portion and an extender portion wherein the pivot head comprises a primary pivot point where the pivot head engages the support frame, a rod pivot point where the cylinder rod engages the pivot head and a neck portion having a lever arm axis, the lever rod portion extends from the neck portion along the lever arm axis and the extender portion extends substantially vertically from the lever rod portion when the lever arm is in the first position.

In one embodiment, a line which is parallel to the lever arm axis in the vertical plane and which passes through the primary pivot point and the rod pivot point is offset from and substantially parallel to the lever arm axis.

In another embodiment, the primary pivot point, the rod pivot point and a point at the commencement of neck portion form a triangle when viewed from the side.

BRIEF DESCRIPTION OF THE DRAWINGS

An embodiment of the invention will be described with reference to the accompanying drawings, in which numerical references denote like parts referred to herein, and in which.

DETAILED DESCRIPTION OF AN EMBODIMENT

Figure 1:
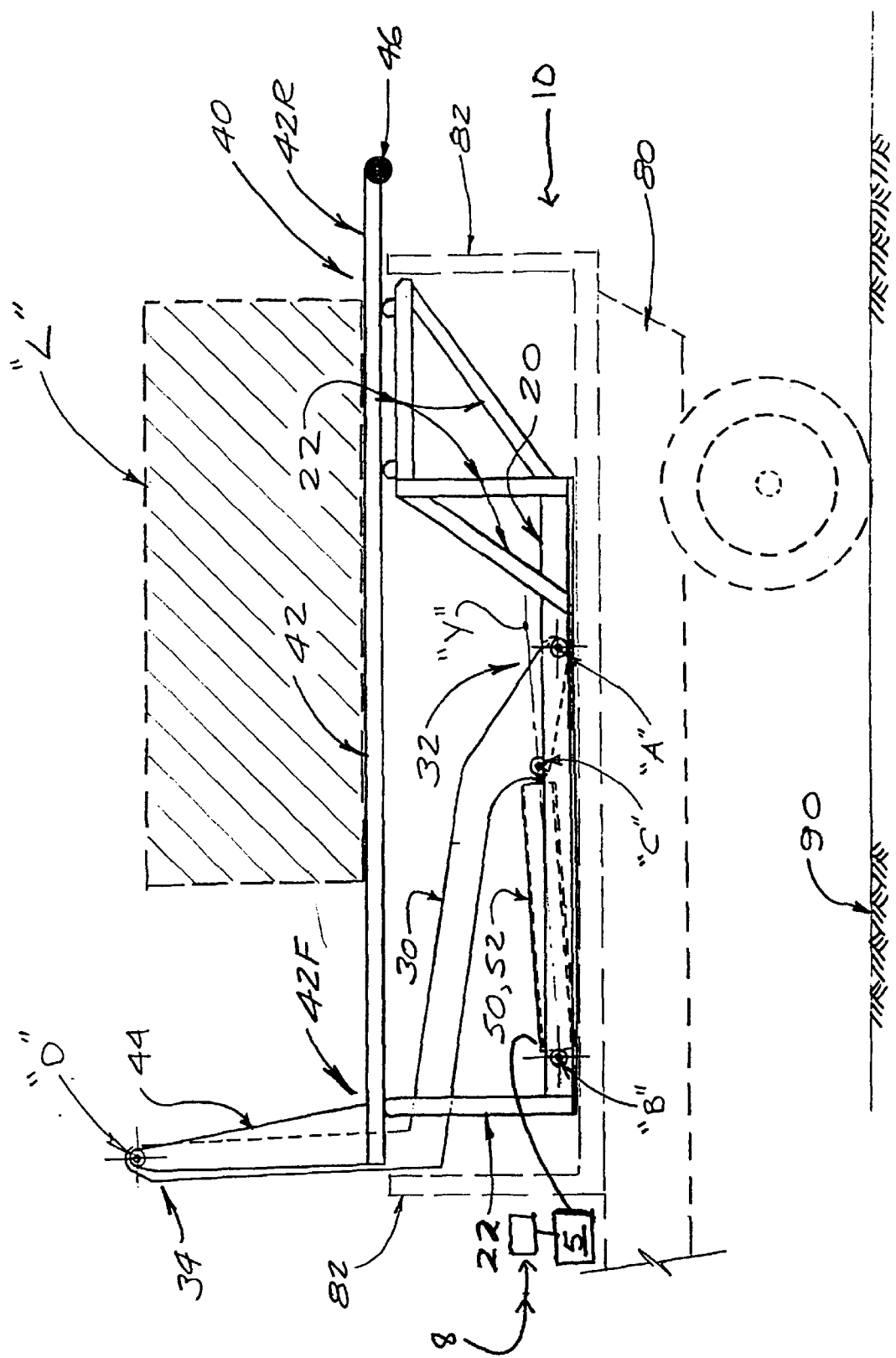
FIG. 1 is a side view of an embodiment of the invention mounted in the box of a pick-up truck, showing the load platform of the invention in the fully retracted position.
Figure 2:
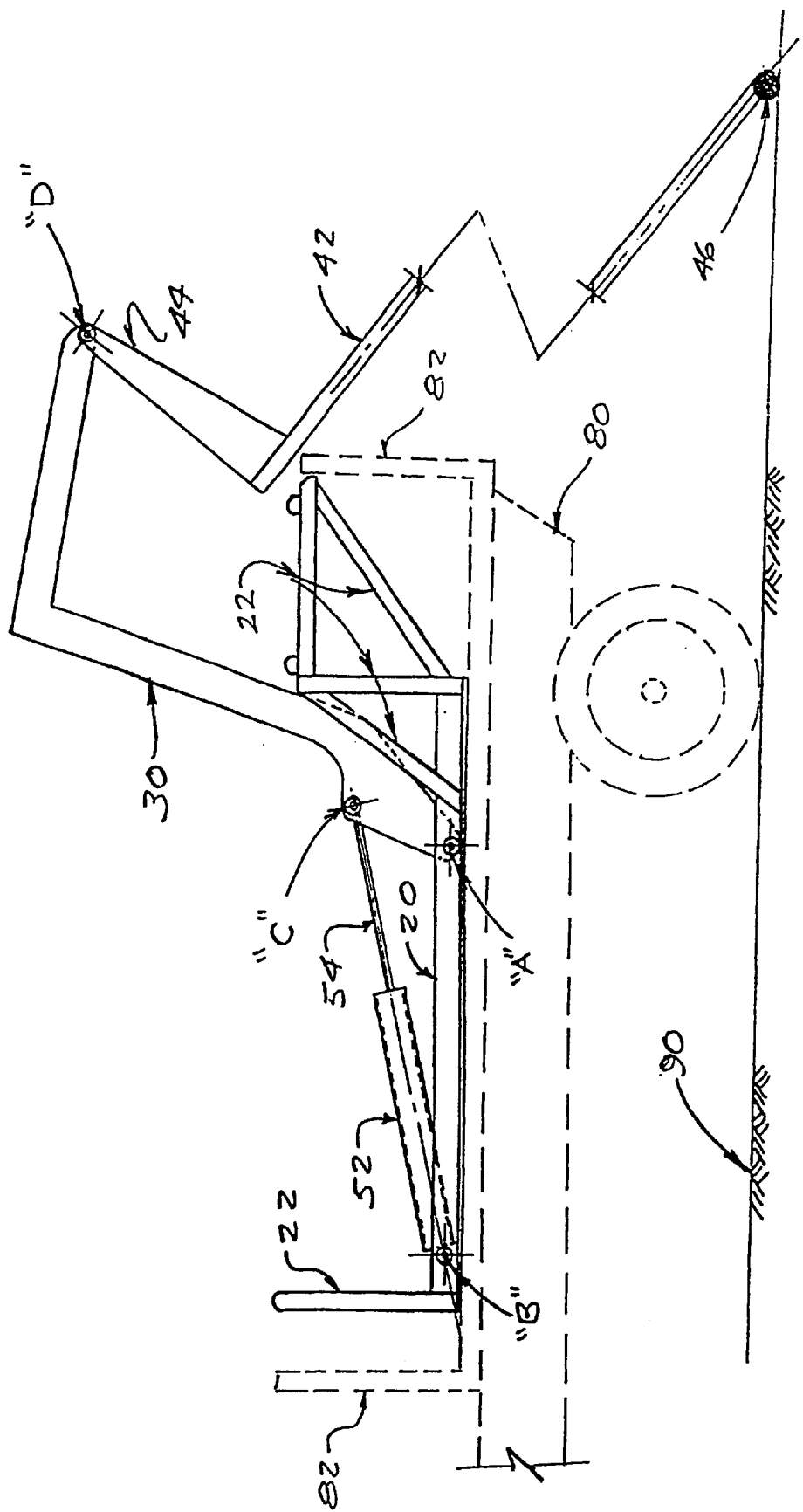
FIG. 2 is a side view of the embodiment, showing the load platform in a partially-extended position.
Figure 3:
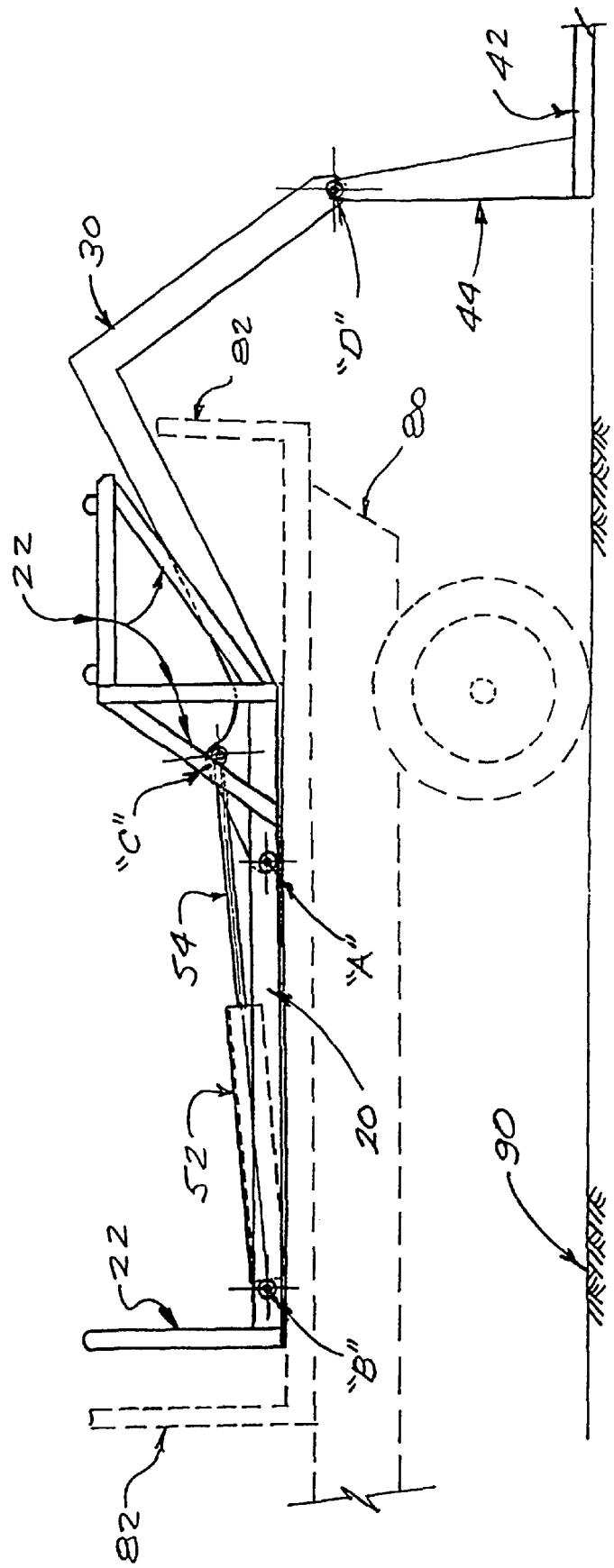
FIG. 3 is a side view of the embodiment, showing the load platform in the fully-extended position.

As illustrated in FIGS. 1, 2, and 3, the present invention generally designated by the reference numeral (10), includes a base frame (20), a lever arm (30), plus a load platform (40) for supporting a load "L" which is desired to be loaded or unloaded using the invention. The base frame (20) may be mounted to the bed of a truck (80), which is depicted in broken outline in the Figures. The invention also includes an actuating means, which in the illustrated embodiment is a hydraulic ram (50) having a cylinder (52) and an extensible piston (54). A power supply (5) is controlled by a controller (8) and powers the activating means.

In the illustrated embodiment, the base frame (20) has an assembly of support struts (22) which project above the walls (82) of the truck (80) such that the load platform (40) may rest on the support struts (22) when the articulating arm (30) is in the fully-retracted position as illustrated in FIG. 1. The configuration of the support struts (22) shown in the Figures is intended for conceptual illustration only, and may be varied or modified without departing from the fundamental concept of the present invention.

As shown in FIGS. 1, 2, and 3, the lever arm (30) has a pivot end (32) which is pivotally connected to the base frame (20) at a point "A", plus a free end (34). The end of the cylinder (52) is pivotally mounted to the base frame (20) at a point "B" near the front of the base frame (20), and the end of the piston (54) is pivotally mounted to the lever arm (30) at a point "C" near the pivot end (32) of the lever arm (30). As will be appreciated by one skilled in the art, the lever arm (30) will act as a third class lever in response to a force applied to it by the hydraulic ram (50).

In the illustrated embodiment, the lever arm (30) comprises three portions: the pivot head (30a), the lever rod (30b) and the extender (30c). The pivot head (30a) is shaped to accomodate the pivots "A"and "C"and the lever (30b) as is shown in the Figures, and particularly in FIG. 1. While in the loaded position shown in FIG. 1, the extender (30c) rises near vertically from the lever rod (30b) and terminates in the free end (34) of the articulating arm (30). The articulating arm (30) may be made of one piece of structural material or the portions of the arm may be separate components which are fastened together.

The load platform (40) may be made up of a loadbed (42) which has a front end (42F) and a rear end (42R), plus one or more upstanding legs (44) rigidly connected to the loadbed (42) and pivotally mounted at a point "D" to the free end (34) of the lever arm (30). Also in the illustrated embodiment, the invention may have one or more wheels (46) rotatably mounted near the rear end (42R) of the roadbed (42). The wheels (46) are not an essential element of the invention and may be deleted or substituted with skids, runners or the like as the case may be.

In alternative embodiments, various tools or implements may be attached to the lever arm (30) in place of the load platform (40). For example, a snow blade may be attached by means of a 3-point hitch. It is possible to attach a winch to the articulating arm (30) so that it may function as a hoist.

Figure 4:
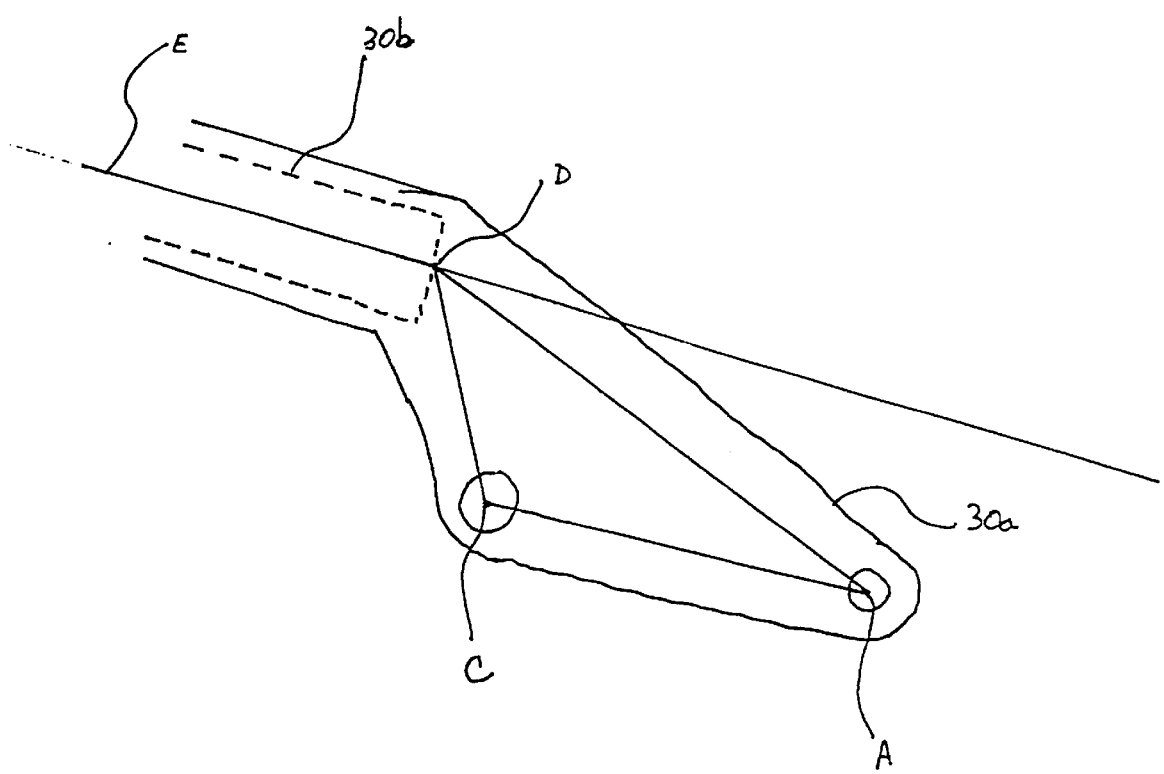
FIG. 4 is a side view of the pivot head demonstrating the geometry of the pivot head of an embodiment.

The configuration of the pivot head (30a) of one embodiment is geometrically depicted in FIG. 4. A line which passes through the primary pivot "A" and the cylinder rod pivot "C" is offset from and substantially parallel to the longitudinal axis "line DE" of the lever rod (30b). As shown, the two lines (DE, AC) are not exactly parallel but rather form an angle of about 3°. As used herein, the term "substantially parallel" shall mean any two lines which form an angle of less than 5°. The offset between line DE and line AC is depicted by triangle ACD. Angle ACD is an obtuse angle of about 115° while angle DAC is an acute angle of about 24°. The appended claims are not intended to be restricted to this specific geometry but retain the basic offset triangular configuration of the pivot head. As used herein, the term "about" shall mean a range of plus or minus 10% from the value stated.

The operation of the illustrated embodiment is shown sequentially in FIGS. 1, 2, and 3. When the piston (54) is fully retracted into the cylinder (52), the loadbed (42) rests on the support struts (22) such that the weight of load "L" is transferred through the support struts (22) to the chassis of the truck (80). In this configuration, the centroidal axis "Y" of the hydraulic ram (50) passes above point "A", such that when the hydraulic ram (50) is actuated and causes the piston (54) to extend out of the cylinder (52), the lever arm (30) will rotate about point "A".

This rotation of the lever arm (30) in turn lifts the front end (42F) of the loadbed (42) off of the support struts (22) while at the same time shifting the entire load platform (40) toward the rear of the truck. As the piston (54) continues to extend out of the cylinder (52), the consequent rotation of the lever arm (30) will ultimately cause the load platform (40) to be lifted entirely clear of the truck (80), as shown in FIG. 2. The wheels (46) attached to the rear end (42R) of the loadbed (42) will come into contact with the ground surface (90) at some point during this procedure. The wheels (46) facilitate movement of the loadbed (42) along the ground surface (90) as the load platform (40) is lifted further out of and away from the truck (80), and also serve to transfer part of the weight of load "L" to the ground. At maximum extension of the piston (54), the lever arm (30) will have lowered the load platform (40) so that it lies flat on the ground surface (90) as illustrated in FIG. 3, thus allowing load "L" to be conveniently loaded onto or off of the loadbed (42).

As is apparent to one skilled in the art, the height of the extender (30c) and the leg (44) may be altered for use with trucks of varying height. Obviously, if the truck bed is lower to the ground, a shorter extender (30c) and leg (44) may suffice.

Figure 5C:
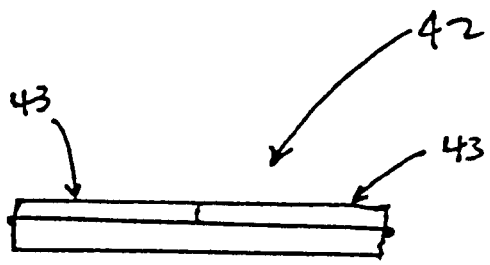
FIG. 5C shows the loadbed in its folded position.
Figure 5B:
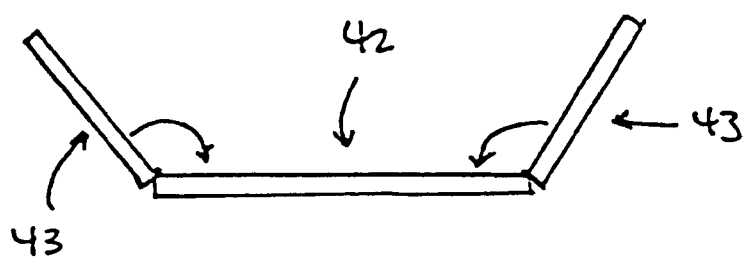
FIG. 5B shows the loadbed folding sections.
Figure 5A:
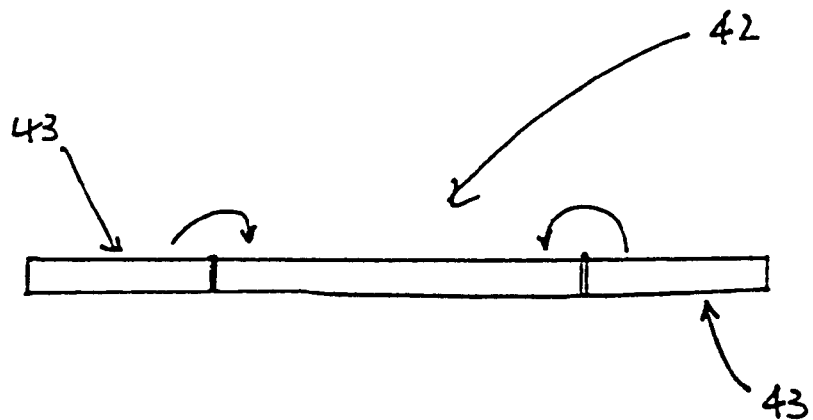
FIG. 5A is a rear end view of the loadbed of the embodiment.

In one embodiment, the loadbed (42) has hinged wings (43) which flip over as shown in FIGS. 5a–c to reduce the width of the roadbed (42). When the loadbed (42) is not in use, the reduced width allows for more convenient driving and parking.

It will be readily seen that the load platform (40), with or without load "L" positioned thereon, may be easily restored to the position shown in FIG. 1 by reversing the steps described above.

A person skilled in the art may readily adapt the illustrated embodiment for heavy duty use involving industrial cargo. For example, there may be provided twin lever arms (30) with twin hydraulic cylinders (52) to provide increased load capacity. Such alternative embodiments are intended to be encompassed by the claims herein.

The foregoing description is of illustrative embodiments of the invention and is not intended to be limiting of the invention as claimed. Persons skilled in the art may make modifications or substitutions without departing from the scope of the invention for which exclusive rights are claimed.

What is claimed is:

1. A truck mounted apparatus for hoisting cargo onto the cargo area of the truck and for lowering the cargo to the ground, said apparatus comprising:

a) a support frame mounted to the truck and having at least one load-bearing surface;

b) a lever arm pivotally engaging the support frame and moveable from a first position to a second position and comprised of a pivot head, a lever rod portion and an extender portion, wherein the pivot head comprises a primary pivot point (A) where the pivot head engages the support frame, a rod pivot point (C) and a neck portion having a lever arm axis; wherein the lever rod portion extends from the neck portion along the lever arm axis and the extender portion extends substantially vertically from the lever rod portion when the lever arm is in the first position;

c) a hydraulic or pneumatic cylinder and piston rod contained within the support frame which is pivotally mounted to die support frame or the truck at one end and pivotally connected to the rod pivot point of the pivot head at the other end, wherein the rod may extend or retract into the cylinder and wherein extension of die rod causes the lever arm to move from its first position to its second position;

d) a power supply for driving the cylinder and piston rod and a controller connected to the power supply for controlling the power supply;

e) a cargo carrier comprising a cargo bed and a link arm rigidly connected to the cargo bed, wherein said link arm is pivotally connected to the extender portion of the lever arm;

f) wherein the cargo carrier rests on the cargo area when the cylinder rod is retracted and the lever arm is in the first position and rests substantially on the ground when the cylinder rod is extended and the lever arm is in the second position; and wherein a line which passes through the primary pivot point (A) and the rod pivot point (C) is offset from and substantially parallel to the lever arm axis;

g) and wherein the primary pivot point (A), the rod pivot point (C) and a point (D) witch is on the intersection of the lever arm axis and a boundary line between the neck portion and the lever rod portion of the lever arm form a triangle in a vertical plane wherein angle ACD is an obtuse angle of about 115° and angle DAC is an acute angle of about 24°.

2. The apparatus of claim 1 herein the cargo bed is a platform comprising at least two sections joined in a hinged manner such that one section may be folded on top of the other section.

3. The apparatus of claim 2 wherein the platform comprises a center section and two wing sections wherein each of the wing sections may fold on top of the center section.

* * * * *